United States Patent
Madampath

(10) Patent No.: US 9,442,725 B2
(45) Date of Patent: Sep. 13, 2016

(54) BRANCH TRACE COMPRESSION

(71) Applicant: VMware, Inc., Palo Alto, CA (US)

(72) Inventor: Rajiv Madampath, Bangalore (IN)

(73) Assignee: AirWatch LLC, Atlanta, GA (US)

( * ) Notice: Subject to any disclaimer, the term of this patent is extended or adjusted under 35 U.S.C. 154(b) by 596 days.

(21) Appl. No.: 13/972,745

(22) Filed: Aug. 21, 2013

(65) Prior Publication Data

US 2015/0058605 A1   Feb. 26, 2015

(51) Int. Cl.
*G06F 9/44* (2006.01)
*G06F 9/30* (2006.01)

(52) U.S. Cl.
CPC ................................ *G06F 9/30058* (2013.01)

(58) Field of Classification Search
None
See application file for complete search history.

(56) References Cited

U.S. PATENT DOCUMENTS

| | | | | |
|---|---|---|---|---|
| 6,189,036 B1 * | 2/2001 | Kao | ........................ | G06F 9/468 709/225 |
| 7,774,741 B2 * | 8/2010 | Sridharan | ........... | G06F 11/0748 711/170 |
| 7,926,043 B2 * | 4/2011 | Vaswani | ............. | G06F 11/3466 717/130 |
| 8,095,914 B1 * | 1/2012 | Singh | .................. | G06F 11/3636 714/38.1 |
| 2008/0005208 A1 * | 1/2008 | Vaswani | ............. | G06F 11/3466 |

OTHER PUBLICATIONS

Dr. David Levinthal PhD., "Performance Analysis Guide for Intel Core i7 Processor and Intel Xeon 5500 processors", Performance Analysis Guide, 2008-2009, Intel Corporation, pp. 1-72.
Call stack compression, downloaded at: encode.ru/threads/1636-Call-stack-compression, Nov. 15, 2012, 2 pages.
Noeth et al., ScalaTrace: Scalable Compression and Replay of Communication Traces for High Performance Computing, Journal of Parallel and Distributed Computing, Sep. 17, 2008, 29 pages.
Soffa et al, Exploiting Hardware Advances for Software Testing and Debugging (NIER Track), ICSE '11, May 21-28, 2011, Waikiki, Honolulu, HI, USA, Copyright 2011 ACM, 4 pages.
IA-32 Intel Architecture Software Developer's Manual, vol. 3B: System Programming Guide, Part 2, Order No. 253669-020US, Jun. 2006, Copyright 1997-2006 Intel Corporation, 530 pages.
Akihiro Nagai, Introduce New Branch Tracer 'pert branch', Linux Technology Center,Yokohama Research Lab, Hitachi Ltd., Copyright 2011 Hitachi Ltd., 35 pages.

* cited by examiner

*Primary Examiner* — Evral E Bodden
(74) *Attorney, Agent, or Firm* — Thomas | Horstemeyer, LLP

(57) ABSTRACT

Exemplary methods, apparatuses, and systems assign a plurality of branch instructions within a computer program to a plurality of prime numbers. Each branch instruction is assigned a unique prime number within the plurality of prime numbers. A run-time branch trace value is determined to be divisible, without a remainder, by a first prime number of the plurality of prime numbers. The run-time branch trace value was generated during execution of the computer program. An output is generated indicating that a first branch instruction assigned to the first prime number was executed.

16 Claims, 12 Drawing Sheets

← 200 define LOG(str) print_msg("[%x]" str, currThread->CombXOR)

```
0xFFFFCDEF    void C()
              {
                LOG("Hello world");
              }

0x0000FDB5    void D()
              {
                LOG("Hello earth");
              }

0xFFFFEFAB    void B()
              {
                C();
              }

0xFFFFABCD    void A()
              {
                if (a == 0) {
                  F2();
                  B();
                }
                D();
              }

0xFFFF1234    main()
              {
                F1();
                if (x == 1) {
                  A();
                }
              }
```

FIG. 2

```
                                    ← 400 define LOG(str) print_msg("[%x]" str, currThread->CombXOR)

void A()
{
  LOG("Hello world");
  C();
} void B()
{
  LOG("Hello earth");
  D();
} main()
{
  void (*fp)();

if (x == 1) {
    fp = A;
  } else {
    fp = B;
  }
  (*fp)();
}
```

FIG. 4

```
1  #include <stdio.h>
2
3  int main()
4  {
5    int a = 1, i;
6    int *ptr = NULL;
7    char string[27], value = 'a';
8    unsigned long branchReg = 0; /*May be a variable added by the compiler rather than original code*/
9
10   if (a == 1) {            ←——————— 705
11     printf("Hello world\n");
12   } else {
13     printf("Hello earth\n");
14   }
15   if (ptr == NULL) {       ←——————— 710
16     for (i = 0; i < 3; i++) {   ←——————— 715
17       string[i] = value + i;
18     }
19     string[i] = '\0';
20   }
21   printf("%s %lu\n", string, branchReg);
22 }
```

```
        .file    "t.c"
        .section .rodata
.LC0:
        .string "Hello world"
.LC1:
        .string "Hello earth"
        .text
.globl main
        .type   main, @function
main:
.LFB0:
        .cfi_startproc
        pushq   %rbp
        .cfi_def_cfa_offset 16
        .cfi_offset 6, -16
        movq    %rsp, %rbp
        .cfi_def_cfa_register 6
        subq    $64, %rsp
        movl    $1, -24(%rbp)
        movq    $0, -16(%rbp)
        movb    $97, -1(%rbp)
        cmpl    $1, -24(%rbp)
        jne     .L2              ←——— 805
        movl    $.LC0, %edi
        call    puts
        jmp     .L3
.L2:
        movl    $.LC1, %edi
        call    puts
.L3:
        cmpq    $0, -16(%rbp)
        jne     .L4              ←——— 810
        movl    $0, -20(%rbp)
        jmp     .L5

.L6:
        movl    -20(%rbp), %eax
        movl    -20(%rbp), %edx
        movl    %edx, %ecx
        movzbl  -1(%rbp), %edx
        leal    (%rcx,%rdx), %edx
        cltq
        movb    %dl, -64(%rbp,%rax)
        addl    $1, -20(%rbp)
.L5:
        cmpl    $2, -20(%rbp)
815 ——→ jle     .L6
        movl    -20(%rbp), %eax
        cltq
        movb    $0, -64(%rbp,%rax)
.L4:
        leaq    -64(%rbp), %rax
        movq    %rax, %rdi
        call    puts
        leave
        .cfi_def_cfa 7, 8
        ret
        .cfi_endproc
.LFE0:
        .size   main, .-main
```

FIG. 8

```
900 ─►    0000000000000000 <main>:
          0:   55                      push   %rbp
          1:   48 89 e5                mov    %rsp,%rbp
          4:   48 83 ec 40             sub    $0x40,%rsp
          8:   c7 45 e0 01 00 00 00    movl   $0x1,-0x20(%rbp)
          f:   48 c7 45 e8 00 00 00    movq   $0x0,-0x18(%rbp)
         16:   00
         17:   c6 45 f7 61             movb   $0x61,-0x9(%rbp)
         1b:   48 c7 45 f8 00 00 00    movq   $0x0,-0x8(%rbp)
         22:   00
         23:   83 7d e0 01             cmpl   $0x1,-0x20(%rbp)
905 ─►   27:   75 0c                   jne    35 <main+0x35>         ◄─── 805
         29:   bf 00 00 00 00          mov    $0x0,%edi
         2e:   e8 00 00 00 00          callq  33 <main+0x33>
         33:   eb 0a                   jmp    3f <main+0x3f>
         35:   bf 00 00 00 00          mov    $0x0,%edi
         3a:   e8 00 00 00 00          callq  3f <main+0x3f>
         3f:   48 83 7d e8 00          cmpq   $0x0,-0x18(%rbp)
910 ─►   44:   75 32                   jne    78 <main+0x78>         ◄─── 810
         46:   c7 45 e4 00 00 00 00    movl   $0x0,-0x1c(%rbp)
         4d:   eb 19                   jmp    68 <main+0x68>
         4f:   8b 45 e4                mov    -0x1c(%rbp),%eax
         52:   8b 55 e4                mov    -0x1c(%rbp),%edx
         55:   89 d1                   mov    %edx,%ecx
         57:   0f b6 55 f7             movzbl -0x9(%rbp),%edx
         5b:   8d 14 11                lea    (%rcx,%rdx,1),%edx
         5e:   48 98                   cltq
         60:   88 54 05 c0             mov    %dl,-0x40(%rbp,%rax,1)
         64:   83 45 e4 01             addl   $0x1,-0x1c(%rbp)
         68:   83 7d e4 02             cmpl   $0x2,-0x1c(%rbp)
915 ─►   6c:   7e e1                   jle    4f <main+0x4f>         ◄─── 815
         6e:   8b 45 e4                mov    -0x1c(%rbp),%eax
         71:   48 98                   cltq
         73:   c6 44 05 c0 00          movb   $0x0,-0x40(%rbp,%rax,1)
         78:   b8 00 00 00 00          mov    $0x0,%eax
         7d:   48 8b 55 f8             mov    -0x8(%rbp),%rdx
         81:   48 8d 4d c0             lea    -0x40(%rbp),%rcx
         85:   48 89 ce                mov    %rcx,%rsi
         88:   48 89 c7                mov    %rax,%rdi
         8b:   b8 00 00 00 00          mov    $0x0,%eax
         90:   e8 00 00 00 00          callq  95 <main+0x95>
         95:   c9                      leaveq
         96:   c3                      retq
```

FIG. 9

BRANCH TRACE COMPRESSION

FIELD OF THE INVENTION

The various embodiments described herein relate to stack traces and branch traces. In particular, embodiments relate to compressing a stack trace or branch trace to efficiently save a context of a point in time of a computer program.

BACKGROUND OF THE INVENTION

A call stack is a data structure that stores information about the active functions (subroutines) of a computer program. For example, when a function is called, a combination of one or more of a return address, arguments, and local variable(s) is pushed onto the stack. Upon completion of the function, the combination is popped off of the stack. A stack trace is a report of the active stack frames at a point in time during the execution of a computer program. A stack trace enables the tracking of the sequence of nested functions called up to the point when the stack trace is generated.

Similarly, a branch trace is a report of branch instructions executed at a point in time during the execution of a computer program. In response to the execution of a branch instruction, the branch instruction address and/or destination instruction address is saved to memory. A branch trace enables a more detailed tracking of the sequence of instructions executed up to the point when the branch trace is generated.

The context provided by a stack trace or branch trace at a given point in a computer program is useful in debugging. For example, a computer program may record log messages to provide an audit trail that can be used to understand system activity and to diagnose problems. Log messages typically do not include calling context beyond the function from which each log message was called. Saving an entire stack trace or branch trace in log messages is not practical. The log message would lose its brevity and writing these messages would be inefficient. Additionally, saving branch traces is costly in terms of memory and execution speed.

SUMMARY OF THE INVENTION

Exemplary methods, apparatuses, and systems include a compiler generating a first metadata file including a plurality of possible stack traces for a computer program. Each possible stack trace represents functions that may be active at various points in time while the computer program is running. In preparing for execution of the program, a second metadata file including an identifier for each function of the computer program is generated. During execution of the computer program, a run-time stack trace value is initialized to zero. For each run-time function call and return, the computer program updates the run-time stack trace value to the result of a mathematical or logical operation, such as an exclusive or (XOR) operation, performed on the current run-time stack trace value and the function identifier for the called or returning function. At a given point in time during execution of the program, the run-time stack trace value represents a compressed stack trace. The computer program saves the run-time stack value as part of a log message or other use of a calling context.

A computer utilizes the first and second metadata files and the run-time stack trace value to generate a stack trace for the calling context at a point in time for a computer program. In generating the stack trace, the computer generates a stack trace value for each of the plurality of possible stack traces in the first metadata file. Generating the stack trace value for each possible stack trace includes performing a series of one or more mathematical or logical operations between all of the function identifiers of the possible stack trace. The computer generates the stack trace for a run-time stack trace value as an output based upon a match between the saved run-time stack trace value and a generated stack trace value.

Additional exemplary methods, apparatuses, and systems generate a plurality of possible branch traces for a function of a computer program. Each possible branch trace represents different sequences of branch instructions that may be executed while the computer program is running. Each branch instruction has a corresponding identifier. A branch trace value is generated for at least one of the plurality of possible branch traces. Generating the branch trace value includes performing a mathematical or logical operation between a first identifier and each subsequent identifier of the possible branch trace to obtain the branch trace value. An output including a branch trace is generated, e.g., in response to receiving or reading a run-time branch trace value. The output branch trace is selected based upon a match between the run-time branch trace value and the generated branch trace value.

Additional exemplary methods, apparatuses, and systems assign a plurality of branch instructions within a function of a computer program to a plurality of prime numbers. Each branch instruction is assigned to a unique prime number. For example, a first branch instruction is assigned to a first prime number. If a run-time branch trace value is determined to be divisible, without a remainder, by the first prime number, an output is generated indicating that the first branch instruction was executed. Alternatively, the branch instructions are each assigned to unique portions of a branch trace array. A run-time branch trace array is an instance of the branch trace array and represents the execution of the computer program up to a point in time. The determination that a portion of a run-time branch trace array includes a non-zero value indicates a corresponding branch instruction was executed.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which:

FIG. 2 illustrates an exemplary computer program to which stack trace compression is applied;

FIG. 4 illustrates another exemplary computer program to which stack trace compression is applied;

FIG. 7 illustrates an exemplary computer program to which branch trace compression is applied;

FIG. 8 illustrates the exemplary computer program of FIG. 7 in an assembly language;

FIG. 9 illustrates an exemplary object dump of the computer program of FIG. 8;

DETAILED DESCRIPTION

Embodiments described herein compress a stack trace into a run-time stack trace value. For each run-time function call and return, a computer program updates the run-time stack trace value to the result of a mathematical or logical operation performed on the current run-time stack trace value and the function address or other identifier for the called or returning function. Corresponding stack trace values are generated for possible stack traces for the program. By matching a run-time stack trace value with a corresponding stack trace value, a stack trace is identified for the calling context at a point in time for a computer program.

Embodiments described herein also compress a branch trace into a run-time branch trace value. For each run-time branch instruction executed, a computer program updates the run-time branch trace value to the result of a mathematical or logical operation performed on the current run-time branch trace value and the branch instruction address or another identifier for the branch instruction. In one embodiment, corresponding branch trace values are generated for possible branch traces for the program. By matching a run-time branch trace value with a corresponding branch trace value, a branch trace is identified for a point in time for a computer program (e.g., within a particular function). In another embodiment, a list of branch instructions executed during run-time is determined by inspecting or otherwise manipulating the run-time branch trace value.

Saving the context of a stack trace or branch trace provides for enhanced debugging. Saving a compressed stack trace or compressed branch trace as a single value maintains the brevity of a log message without the performance sacrifice of writing an entire trace. A similar benefit is realized when saving the compressed trace value in a lock data structure when a lock is acquired or released, e.g., for debugging race conditions. Compressed stack and branch traces may also be used for memory leak detection, enhanced tracing techniques, etc.

Stack Trace Compression

Figure 1:
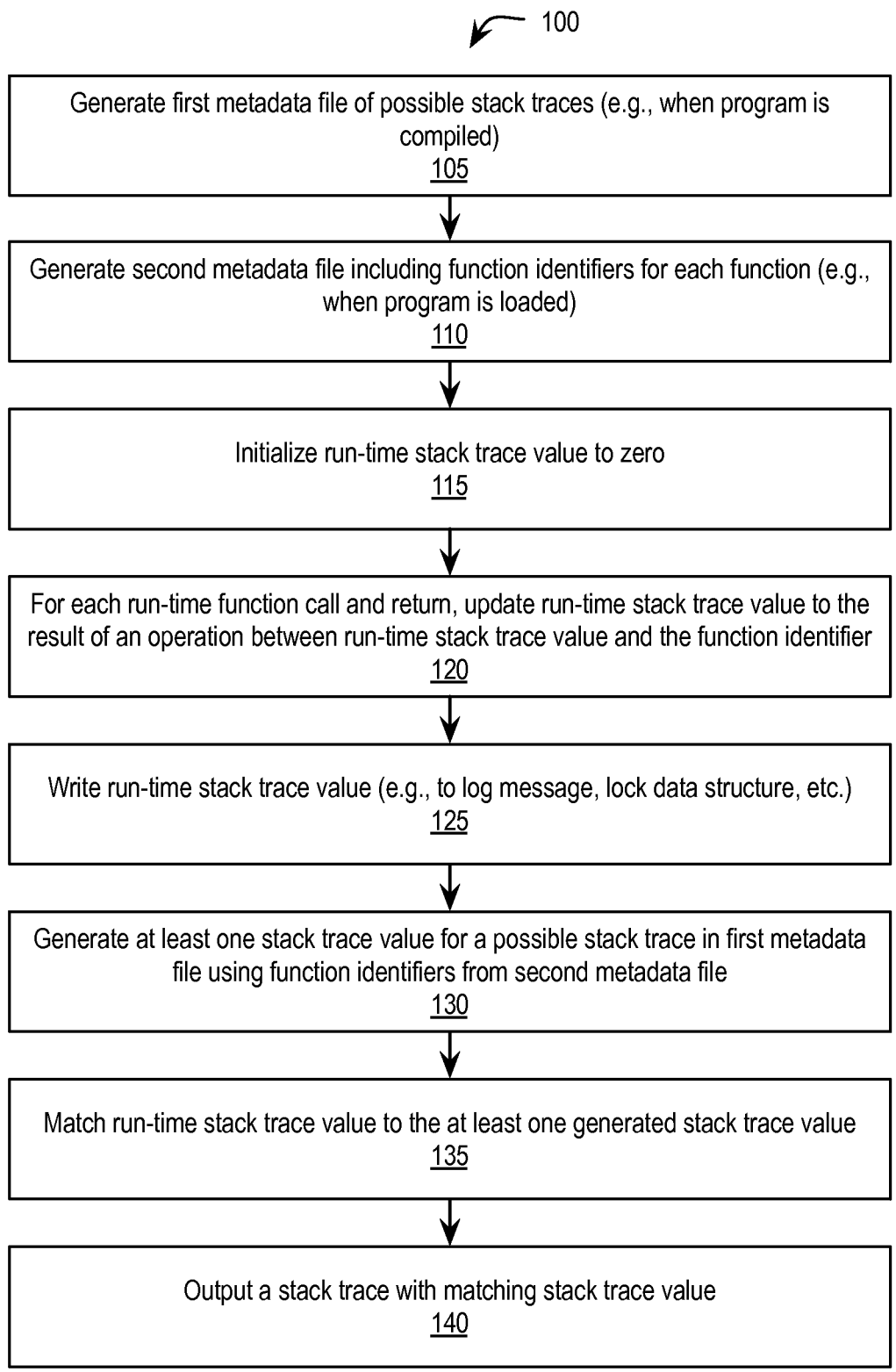
FIG. 1 is a flow chart illustrating an exemplary method of generating a compressed stack trace value during run-time of a computer program and determining a stack trace based upon the compressed stack trace value.

FIG. 1 is a flow chart illustrating exemplary method 100 of saving a compressed stack trace value and determining a stack trace based upon the compressed stack trace value. At block 105, a computer generates a plurality of possible stack traces for a computer program. Each stack trace represents functions that may be active while the computer program is running. For example, during compilation of the computer program, the computer may utilize a control-flow or call graph to determine each combination of nested functions that would be present in a call stack at each point of time in the execution of program. Alternatively, the computer may use a tool to inspect the computer program's source code and generate the control-flow graph and determine possible stack traces. In one embodiment, the computer saves the generated plurality of stack traces in a file, database, or other data structure (referred to herein as the compiler metadata file). In one embodiment, the computer generates all possible stack traces for the computer program. In an alternate embodiment, the computer generates a subset of the possible stack traces for the computer program.

FIG. 2 illustrates exemplary computer program 200, to which stack trace compression may be applied. While FIG. 2 is described with reference to a program written in a compiled programming language, in other embodiments, stack traces and stack trace values are generated for a computer program written in an interpreted programming language. A compiler may generate a control-flow graph of computer program 200 to perform optimizations and otherwise find calling relationships between functions. In walking through paths in the control-flow graph, the compiler also generates possible stack traces. For example, during the traversal of the control-flow graph, assume the current nodes that have already been traversed are main( ) A( ), and B( ). In this case, the current stack trace that is written into the compiler metadata file is {main, A, B} (representing main( ) at the bottom of the stack and B( ) at the top of the stack). The state of this stack trace is reached as each function is called and/or returned (e.g., in response to "call" or "ret" instructions) as follows: main would have been pushed onto the call stack, F1( ) would have been pushed onto the call stack, F1( ) would be popped off of the call stack when F1( ) returns to main( ), A( ) would have been pushed onto the call stack (assuming the condition x==1 is met), F2( ) would have been pushed onto the call stack (assuming the condition a==0 is met), F2( ) would be popped off of the call stack when F2( ) returns to A( ), and B( ) would have been pushed onto the stack. Similarly, the nodes are walked based upon variations of the conditions being met/not met to generate alternate stack traces. Other possible stack traces for computer program 200 include {main}, {main, F1}, {main, A}, {main, A, F2}, {main, A, B, C}, and {main, A, D}.

Returning to FIG. 1, at block 110, a computer generates a mapping of functions to identifiers for each function of the computer program. In one embodiment, the identifiers are function addresses. As used herein, function addresses correspond to memory address locations into which functions of a computer program are loaded for execution. For example, during or following the loading of the program into memory for execution, the computer saves the function names and the corresponding function addresses into a file, database, or other data structure (referred to herein as the loader metadata file). Computer programs with an executable file are generally loaded at fixed virtual addresses. These addresses may be obtained from the executable file, e.g., in the Executable and Linkable Format (ELF) header. Dynamically loaded shared libraries, however, are loaded at available virtual addresses at run-time. A loader may be used to obtain the function addresses and generate the loader metadata file.

In one embodiment, a single computer performs both the compiling and loading of the program. Alternatively, a first computer compiles the program and generates the compiler metadata file while a second computer loads the program and generates the loader metadata file.

A loader metadata file for computer program 200 may include the entries shown in the following table and which correspond to the illustrated addresses in FIG. 2.

TABLE 1

Loader Metadata File

| | |
|---|---|
| 0xFFFF1234 | main( ) |
| 0xFFFF5678 | F1( ) |
| 0xFFFF9ABC | F2( ) |
| 0xFFFFABCD | A( ) |
| 0xFFFFEFAB | B( ) |
| 0xFFFFCDEF | C( ) |
| 0x0000FDB5 | D( ) |

In an alternate embodiment, the identifier is another unique identifier assigned to each function. For example, each of a sequence of unique numbers is mapped to each function in a computer program.

At block 115, the computer initializes a run-time stack trace value to zero during the execution of the computer program. In one embodiment, the computer program is multi-threaded. In such an embodiment, the run-time stack trace value is made an attribute of each thread/process and initialized to zero during thread/process creation.

At block 120, the computer updates the run-time stack trace value for each function call and function return during execution of the computer program. The run-time stack trace value is updated to the result of a mathematical or logical operation between the current run-time stack trace value and the identifier of the function being called or returning. For example, the computer program obtains the function address for a called function from the program counter or instruction pointer. The computer performs an XOR operation on the obtained function address and the run-time stack trace value and the result is the new value for the run-time stack trace value. The computer stores the obtained function address for use again when the function returns. In one embodiment, call and return instructions are modified to perform the XOR operation (or other mathematical/logical operation) and the computer stores the run-time stack trace value and/or the saved function address in one or more registers. The computer may quickly execute call and return instructions by accessing operands for these operations from the hardware registers. Alternatively, the computer saves the run-time stack trace value and/or the saved function address in memory, e.g., the run-time stack trace value may be saved in thread-local storage and function addresses may be saved at fixed offsets from either the top or base of each stack frame.

For example, during execution of computer program 200, the computer initializes the run-time stack trace value to zero (0x00000000). The function addresses in Table 1 above represents the function addresses obtained from the program counter or instruction pointer during execution and used by the computer to update the run-time stack trace value. When computer program 200 starts executing by calling main( ), the computer updates the run-time stack trace value using the function address for main( ), 0xFFFF1234, as follows: run-time stack trace value=0x00000000 XOR 0xFFFF1234=0xFFFF1234. When F1( ) is called, the function address for F1( ), 0xFFFF5678, is used and the run-time stack trace value=0xFFFF1234 XOR 0xFFFF5678=0x0000444C.

In one embodiment, the computer saves the function address for each function called. For example, the function address for F1( ) is saved because this function address will no longer be easily obtained from the program counter or instruction pointer when F1( ) returns. When F1( ) returns, the saved function address for F1( ) is retrieved and the run-time stack trace value=0x0000444C XOR 0xFFFF5678=0xFFFF1234. In this example, the computer performs an XOR operation with the same function address twice as a result of F1( ) being called and returning. As a result, the computer updates the run-time stack trace value to eliminate the effect of the original XOR of the function address for F1( ). The run-time stack trace value is currently 0xFFFF1234, representing that only main( ) remains in the stack.

Assuming the condition (x==1) is met, computer program 200 calls A( ) and the run-time stack trace value=0xFFFF1234 XOR 0xFFFFABCD=0x0000B9F9. When F2( ) is called, the run-time stack trace value=0x0000B9F9 XOR 0xFFFF9ABC=0xFFFF2345. When F2( ) returns, the function address for F2( ) is retrieved and the run-time stack trace value returns to its previous value, 0xFFFF2345 XOR 0xFFFF9ABC=0x0000B9F9. When B( ) is called, the run-time stack trace value=0x0000B9F9 XOR 0xFFFFEFAB=0xFFFF5652. When C( ) is called, the run-time stack trace value=0xFFFF5652 XOR 0xFFFFCDEF=0x00009BBD.

The stack trace at this point of execution is represented by {main, A, B, C}. Using a compressed stack trace in the form of the run-time stack trace value, the single value of 0x00009BBD represents the entire stack trace. At block 125, the computer writes or otherwise saves a copy of the run-time stack trace value to provide the calling context at a point in time of execution for a log message, lock, etc. For example, computer program 200 includes a run-time stack trace value named CombXOR. The first line of computer program 200 configures log messages to be printed as a string preceded by or followed by the run-time stack trace value. Continuing the example above, the log message in CO may print the following log message: [0x00009BBD] Hello world.

If a function is recursive, every other iteration of the function calling itself will have the same effect to the run-time stack trace value as the function returning when using an XOR operation to update the run-time stack trace value. In other words, every even number of calls of the same recursive function will result in a run-time stack trace value equal to the run-time stack trace value prior to the first call to the recursive function. Similarly, every odd number of calls of the same recursive function will result in a run-time stack trace value equal to the run-time stack trace value following a single call to the recursive function.

In one embodiment in which an XOR operation is used to update the run-time stack trace value, the computer generating the compiler metadata file recognizes a function as being recursive. As a result, the computer generates stack traces corresponding to only to zero and one instance of each recursive function. Additionally, the computer may annotate each stack trace with zero or one instance of the recursive function as possibly including, respectively, and even or odd number of recursive calls to the recursive function.

While the example above is described with reference to an XOR operation, the computer may apply one or more other mathematical or logical operations to update the run-time stack trace value. For example, each time a function is called, the computer may add the function's identifier to the run-time stack trace value. Each time the function returns, the computer may subtract the function's identifier from the run-time stack trace value. In yet another embodiment, each time a function is called, the computer may multiply the function's identifier to the run-time stack trace value, which would begin with an initial value of one or another non-zero value. Each time the function returns, the computer may divide the run-time stack trace value by the function's identifier.

At block 130, a computer generates stack trace value(s) for at least one possible stack trace in the compiler metadata file using the function identifiers from the loader metadata file. For example, if a first computer compiles the computer program and a second computer loads and executes the program, the first computer generated the compiler metadata file and receives the loader metadata file from the second computer. Alternatively, a second computer generated the loader metadata file and receives the compiler metadata file from the first computer. In another embodiment, a third computer receives the compiler metadata file from the first computer and the loader metadata file from the second computer. In yet another embodiment, a single computer generates both metadata files.

Similar to the updating of the run-time stack trace value described with reference to block 120, the computer generates stack trace values for possible stack traces by performing a series of one or more mathematical or logical operations between the function identifiers of the stack trace. The following table illustrates the generation of stack trace values using an XOR operation for each of the possible stack traces described above with reference to the compiler and loader metadata files for computer program 200. If a possible stack trace includes a single function, the stack trace value is set to the function address for that function.

TABLE 2

Stack Trace Values

| | |
|---|---|
| {main} | 0xFFFF1234 |
| {main, F1} | 0xFFFF1234 XOR 0xFFFF5678 = 0x0000444C |
| {main, A} | 0xFFFF1234 XOR 0xFFFFABCD = 0x0000B9F9 |
| {main, A, F2} | 0xFFFF1234 XOR 0xFFFFABCD XOR 0xFFFF9ABC = 0xFFFF2345 |
| {main, A, B} | 0xFFFF1234 XOR 0xFFFFABCD XOR 0xFFFFEFAB = 0xFFFF5652 |
| {main, A, B, C} | 0xFFFF1234 XOR 0xFFFFABCD XOR 0xFFFFEFAB XOR 0xFFFFCDEF = 0x00009BBD |
| {main, A, D} | 0xFFFF1234 XOR 0xFFFFABCD XOR 0x0000FDB5 = 0x0000444C |

In an embodiment that uses a mathematical or logical operation other than an XOR operation, the generation of stack trace values for a computer program that utilizes a recursive function includes detecting the presence of the recursive function and annotating a stack trace with a number of levels of recursion are involved at a given point in time. In one embodiment, the annotation of a number of levels of recursion is limited to a predetermined maximum value.

At block 135, the computer matches a run-time stack trace value to a generated stack trace value from the possible stack traces. For example, the computer may use/receive the above-described log message "[0x00009BBD] Hello world." Using the run-time stack trace value, 0x00009BBD, the computer determines that the run-time stack trace value matches the stack trace value for stack trace {main, A, B, C}.

Different possible stack traces may result in the same stack trace value. Referring to the example in Table 2 above, both {main, F1} and {main, A, D} result in the same stack trace value of 0x000444C. When the run-time stack trace value is 0x0000444C, the computer finds two matching stack traces. In one embodiment, the computer selects a matching stack trace between the two by determining that at least a portion of a log message associated with run-time value matches a command to print a log message in a top-most function in the stack trace. For example, assume the log message was "[0x0000444C] Hello earth." Given that 0x0000444C matches the two stack traces, the computer will select the stack trace with a top-most function having a command to print at least a portion of the string "Hello earth." In this example, we can assume that F1( ) does not include such a string. The computer determines that D( ) includes the command LOG("Hello earth"), which will print the matching string. As a result, the computer selects the stack trace {main, A, D} as the calling context matching the log message "[0x0000444C] Hello earth."

In one embodiment, a log message or lock is executed by the calling of one or more nested logging/locking functions, e.g., to add the run-time stack trace value to the log message or lock. The calling of a nested logging/locking function may alter the value of the run-time stack trace value and the nested logging/locking function may be at the top of the stack trace at such a point in time. In such an embodiment, the computer determines which stack trace includes a top-most non-nested logging/locking function (e.g., at the top, second from the top, etc.) that includes the string of interest.

At block 140, the computer outputs the matching stack trace. For example, the computer may output {main, A, B, C} to a display, file, program, etc. to provide the calling context of the log message "[0x00009BBD] Hello world." In an embodiment in which the calling context is provided for a log message in a recursive function, the computer may further include the above-described annotation regarding an even, odd, or explicit/maximum number of calls to the recursive function.

Figure 3:
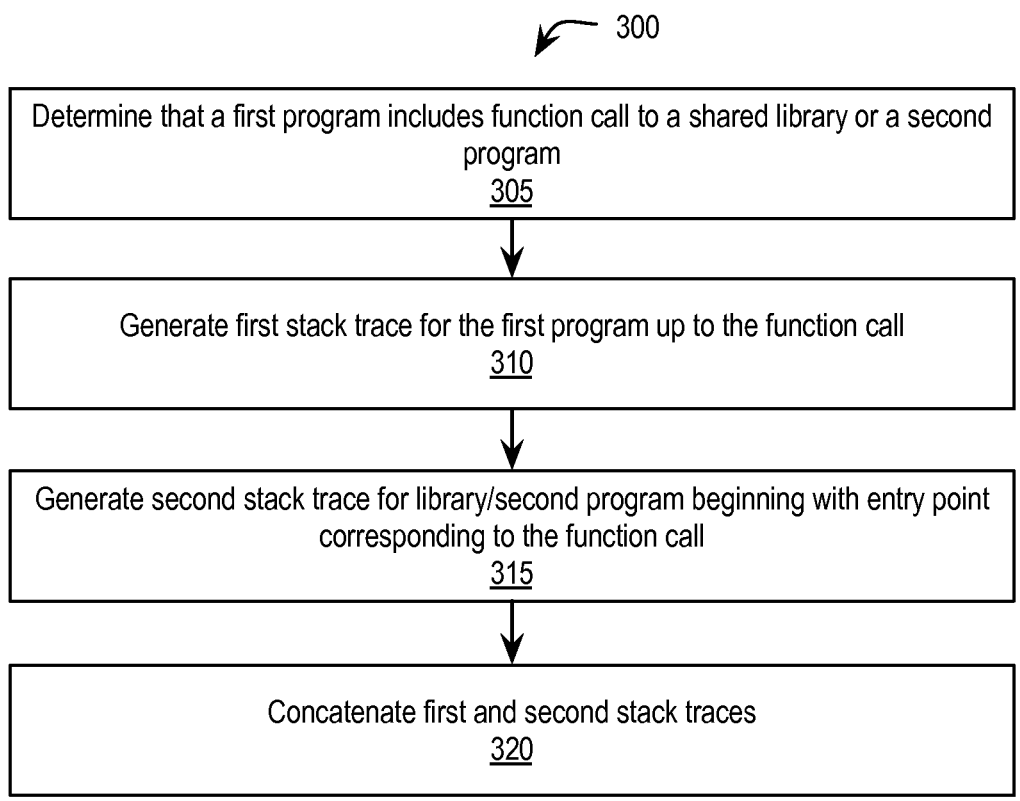
FIG. 3 is a flow chart illustrating an exemplary method of generating possible stack traces for a computer program that includes a function call to a library or another computer program.

FIG. 3 is a flow chart illustrating exemplary method 300 of generating possible stack traces for a computer program that includes a function call to a library or another computer program. For example, a main program may have a function call to a shared library or an application programming interface (API) call into another program. In one embodiment, the main program is compiled separately from the shared library/other program and linked at a later stage. As a result, each of the main program and the shared library/other program will have a separate compiler metadata file. Method 300 addresses this complication by generating first and second stack traces for each and concatenating the resulting first and second stack traces. Method 300 may be performed as a portion of block 105 described above.

At block 305, the computer determines that a first computer program includes a function call to a shared library or a second computer program. For example, F2( ) of computer program 200 may be a call to a shared library or another computer program. The computer determines that F2( ) is not defined within computer program 200.

Given that computer program 200 does not define F2( ), at block 310, the computer generates a first compiler metadata file including a first stack trace up to the function call to a shared library or second program. At the time the computer calls F2( ) the stack trace is {main, A, F2}. In one embodiment, the computer saves a list of external functions called to a shared library/second program.

At block 315, the computer separately generates a second compiler metadata file, e.g., when compiling the shared library or second program. While generating stack traces for the first program, the computer determines that the first program is linked to the shared library/second program. The computer further determines from the saved list of external functions for the first program that a function call from the first program corresponds to a function to serve as an entry point in the shared library/second program. As a result, the computer generates a stack trace for the second program originating with the matching function. For example, the computer may save F2( ) during the compilation of computer program 200 and, upon determining that program 200 is linked to a shared library and while compiling the shared library, find a match for the call to F2( ). F2( ), as defined in the shared library, may call one or more functions that are also defined in the shared library. For example, if F2( ) called F2-1( ) which in turn called F2-2( ) the computer would generate call stacks for the second compiler metadata file with F2 as the entry point: {F2, F2-1}, {F2, F2-1, F2-2}, etc.

At block 320, the computer concatenates a first stack trace from the first compiler metadata file with a second stack trace from the second compiler metadata file. For example, for every stack trace in the first compiler metadata file in which there is a shared library function at the top of the stack (e.g., {main, A, F2}), the computer generates an aggregated stack trace by merging appropriate stack traces from the second compiler metadata file (e.g., {main, A, F2, F2-1}, {main, A, F2, F2-1, F2-2}, etc.). As used herein, the concatenation of stack traces does not create a redundancy of the function that links the first program and the shared library/second program. For example, both the first and second compiler metadata files include F2( ) at the respective top and bottom of their stack traces. The exemplary first and second stack traces both include F2 to illustrate that the second stack trace begins where the first stack trace ends. In performing the concatenation of two stack traces, if F2( ) is found in both the first and second stack traces, F2( ) is only included once in the concatenated stack trace. In one embodiment, the redundant function may be omitted from either the first stack trace or the second stack trace for concatenation. In one embodiment, the computer generates the first or second stack trace without including the function call to the shared library or second computer program to avoid having a redundant function in the stack traces.

In one embodiment, the computer program includes a function call into a third party library. The computer/compiler that compiles the computer program may not compile the third party library. Additionally, the third party library may not include stack trace compression features described herein and may not have a corresponding compiler metadata file. If the computer program includes such a third party library call, e.g., for a function named 3rdp_sharedF, an exemplary stack trace may be {main, A, B, 3rdp_sharedF}. Following the examples above, the run-time stack trace value for the stack trace {main, A, B} is 0xFFFF5652. When 3rdp_sharedF( ) is called from B( ), the value of the run-time stack trace value is not changed—i.e., a mathematical/logical operation is not performed between the run-time stack trace value and the function identifier for 3rdp_sharedF( ). Additionally, no matter how many functions 3rdp_sharedF( ) calls within the 3rd party shared library, the run-time stack trace value remains unchanged until B( ) calls another function or returns to A( ).

The computer generates stack trace values for stack traces including a third party library function call in a similar manner. For example, the computer generates the same value 0xFFFF5652 for possible stack traces {main, A, B} and {main, A, B, 3rdp_sharedF}. When the computer searches for a match between a run-time stack trace value and the generated stack trace values, the computer will find both stack traces {main, A, B} and {main, A, B, 3rdp_sharedF}.

As described above, the use of a log message may help the computer select between stack traces with a common stack trace value. For example, B( ) may print a log message with the string "Hello mars" after B( ) calls 3rdp_sharedF( ). When the value 0xFFFF5652 is obtained from this log message, the computer will find the two matching stack traces. The computer selects between them by determining that the third party function, 3rdp_sharedF( ), could not have printed a log message with a run-time stack trace value. As a result, the computer selects {main, A, B} as the match. Alternatively, the computer may attempt to find at least a partial match for a string included in a log message. Given that any part of the log message string could have been the result of a formatted print statement, the computer searches in the top function for the entire log message string (excluding the run-time stack trace value) and all substrings thereof. If the computer finds a match for the string or any substring, the computer selects the corresponding stack trace. For example, the computer may search for sub-strings from the log message that are not part of a formatted message. An exemplary message "[0xFFFF5652] Hello 1 mars" is generated by a formatted print statement, such as LOG("Hello % d mars", count). In determining the calling context of this log message, the computer may search in the top functions of both possible stack traces for the string "Hello" and/or the string "mars" while eliminating the number from the search.

FIG. 4 illustrates exemplary computer program 400, which includes an indirect function. The function pointer, *fp, is defined in main( ) and used to call the indirect function, (*fp)( ). In one embodiment, the computer compiling computer program 400 detects that fp is a variable that can take the identifier of a function at run-time.

Figure 5:
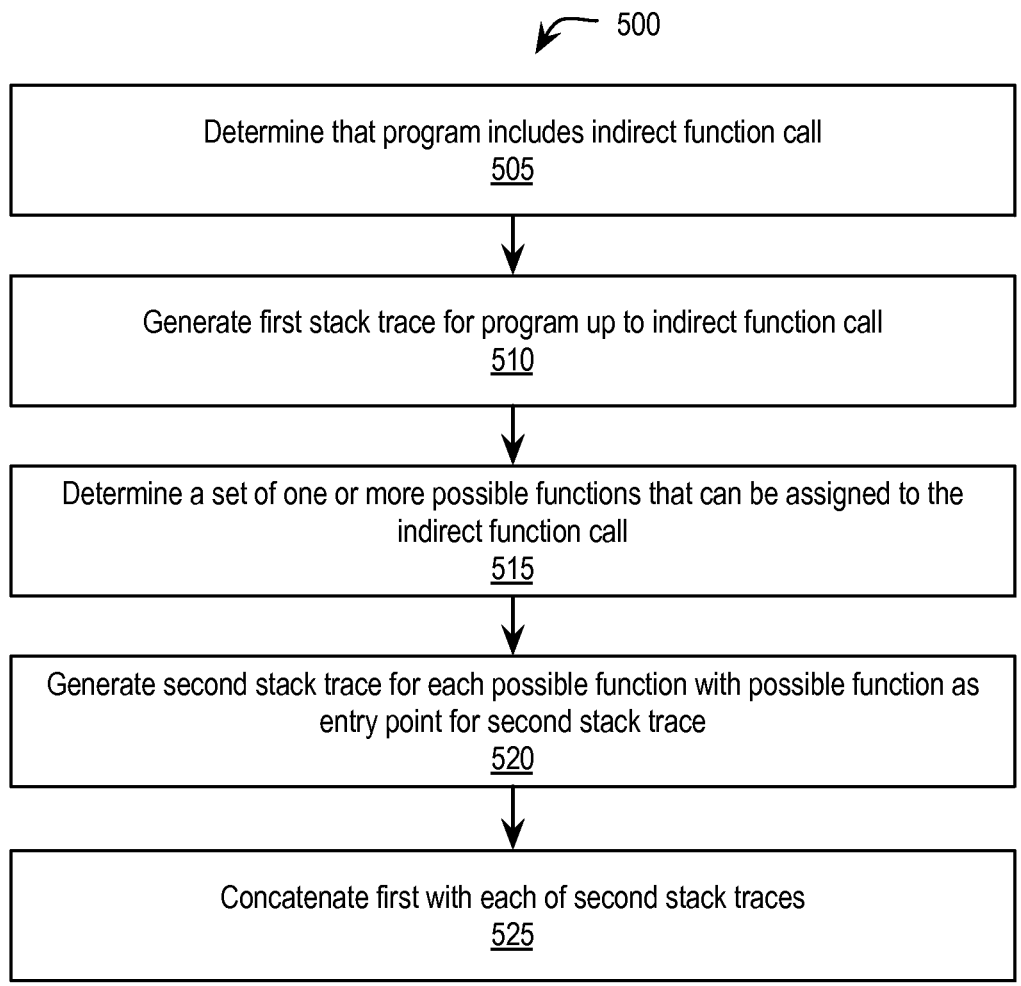
FIG. 5 is a flow chart illustrating an exemplary method of generating possible stack traces for a computer program that includes an indirect function call.

FIG. 5 is a flow chart illustrating exemplary method 500 of generating possible stack traces for a computer program that includes an indirect function call. At block 505, the computer determines that the program includes indirect function call. The set of functions to which the function pointer resolves at run-time is usually known at compile-time. For example, during compilation, the computer may identify the function as using a function pointer and functions that may be assigned to the function pointer. While the examples of an indirect function described herein utilize a function pointer, method 500 may generate stack traces for other types of indirect functions.

At block 510, the computer generates a first stack trace for the computer program up to the indirect function call. For example, the computer compiling computer program 400 generates a first stack trace represented as {main, fp}.

At block 515, the computer determines a set of one more possible functions that can be assigned to the indirect function call. For example, during compilation of computer program 400, the computer keeps track of assignments to fp, such as fp=A, and fp=B, and saves the mapping and/or assigned function names, A and B. In one embodiment, the computer adds an annotation, such as "indirect function call <function-names>" next to calls to indirect functions in stack traces in the compiler metadata file. In the place of <function-names>, the computer lists function names that may be assigned to the indirect function. For example, the first stack trace above would be modified to {main, fp indirect function call A B}.

At block 520, the computer generates a second stack trace for each possible function with the possible function as an entry point for the second stack trace. Referring again to computer program 400, the computer generates all stack traces corresponding to A( ) and B( ) as entry points: {A}, {A, C}, {B}, and {B, D}.

At block 525, the computer concatenates the first stack trace with each of the second stack traces. For example, the computer creates stack traces for computer program 400 by concatenating all stack traces with A( ) and B( ) as an entry point (at the bottom of the stack) and all stack traces that have fp( ) at the top of the stack. In one embodiment, the concatenation includes the computer identifying the "indirect function call <function-names>" annotation and replacing the indirect function call at the top of the stack in the first stack trace with each of the second stack traces. The computer would create the following concatenated stack traces for computer program 400: {main, A}, {main, A, C}, {main, B}, and {main, B, D}. In an alternate embodiment, the concatenation includes retaining the "indirect function call <function-names>" annotation and removing the redundant function call from the bottom of the second stack trace.

In one embodiment, the computer compiler is not aware of all functions to which an indirect function pointer resolves. For example, this may occur when third party modules (such as 3rd party device drivers) can register their own functions at run-time for indirect function calls. In such cases, as the third party module lacks the compiler metadata file and ability to update a run-time stack trace value, the run-time stack trace value computation stops at the call to the third party indirect function. When generating the compiler metadata file, the computer annotates the possible stack trace(s) following the point where the indirect function call is made, e.g., with "NO RE-ENTRY" or a similar indication of the third party indirect function call. The resultant run-time stack trace value that stopped at the third party indirect function call may then be matched to a corresponding annotated possible stack trace.

Branch Trace Compression

Figure 6:
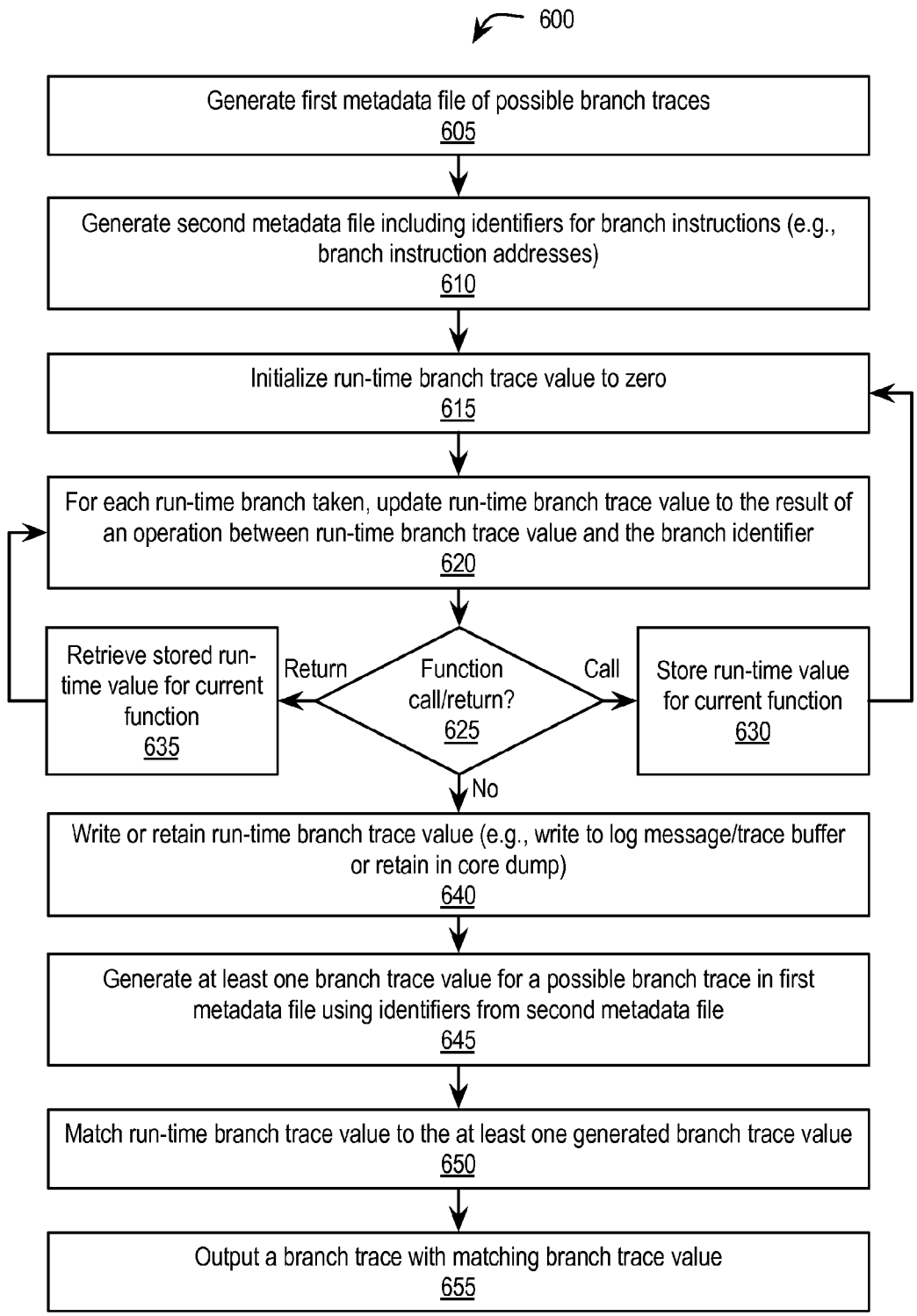
FIG. 6 is a flow chart illustrating an exemplary method of generating a compressed branch trace value during run-time of a computer program and determining a branch trace based upon the compressed branch trace value.

FIG. 6 is a flow chart illustrating exemplary method 600 of generating a compressed branch trace value during run-time of a computer program and determining a branch trace based upon the compressed branch trace value. As used herein, a branch trace refers to branch instructions executed up to a point in time during execution of a computer program or function within the computer program. Exemplary branch instructions (in a compiled programming language) include conditional "if" statements and loop instructions, such as "for," "while" and "do-while."

At block 605, a computer generates a plurality of possible branch traces for a function within a computer program. Each branch trace represents different sequences of branch instructions that may be executed while the computer program is running. For example, during compilation of the computer program, the computer may utilize a control-flow graph to determine each combination of branch instructions that may be executed within each function. Alternatively, the computer may use a tool to inspect the computer program's source code, generate a control-flow graph, and determine possible branch traces. In one embodiment, the computer saves the generated plurality of branch traces in a file, database, or other data structure (referred to herein as the compiler metadata file). In one embodiment, the computer generates a subset of the possible branch traces for the computer program for a given compiler metadata file. For example, the computer may generate a compiler metadata file for each of one or more functions of the computer program. In an alternate embodiment, the computer generates all possible stack traces for the computer program.

FIG. 7 illustrates exemplary function 700 of a computer program to which branch trace compression is applied. While FIG. 7 is described with reference to a program written in a compiled programming language, in other embodiments, branch traces and branch trace values are generated for a computer program written in an interpreted programming language. A compiler (or other tool) may generate and use a control-flow graph of function 700 to perform optimizations and otherwise find possible paths of execution. In walking through paths in the control-flow graph, the compiler also generates possible branch traces.

A branch is a sequence of program code that is executed when a condition is met. For example, upon reaching the "if" statement 705 in line 10 of function 700, the program may proceed to line 11 if the condition (a==1) is true. Otherwise, function 700 continues with the else statement in line 12 of function 700. If statement 710 and for loop 715 represent additional branch instructions. A control-flow graph for function 700 would represent each possible execution path given the three exemplary branch instructions 705, 710, and 715.

FIG. 8 illustrates exemplary function 800 of the computer program in an assembly language and represented in two columns. Function 800 continues from the bottom of the left column to the top of the right column. Function 800 is the assembly language equivalent of function 700. Function 800 includes three conditional jump commands/branch instructions 805, 810, and 815 that are equivalent to branch instructions 705, 710, and 715, respectively. Accordingly, a control-flow graph for function 800 would represent each possible execution path given the three exemplary branch instructions 805, 810, and 815.

Returning to FIG. 6, at block 610, a computer generates a mapping of identifiers to branch instructions. In one embodiment, the identifiers are branch instruction addresses. As used herein, branch instruction addresses correspond to memory address locations into which branch instructions within functions of a computer program are loaded for execution. For example, during or following the loading of the program into memory for execution, the computer saves the function names and the corresponding function addresses into a file, database, or other data structure (referred to herein as the loader metadata file). Computer programs with an executable file are generally loaded at fixed virtual addresses. These addresses may be obtained from the executable file, e.g., in the Executable and Linkable Format (ELF) header. Dynamically loaded shared libraries, however, are loaded at available virtual addresses at run-time. A loader may be used to obtain the function addresses and generate the loader metadata file. As described above, compiling and loading of the program, and corresponding generation of compiler and loader metadata files, may be performed by separate computers.

For example, a loader or tool that parses the ELF header determines function 800 has an address of 0x400504. In one embodiment, the computer generates an object dump of function 800 to determine the address of each branch instruction within function 800. As used herein, an object dump refers to a listing of instructions with corresponding instruction address offset values from a function address.

FIG. 9 illustrates exemplary object dump 900 of function 800. Branch instructions 805, 810, and 815 are shown with offset values 905, 910, and 915, respectively, in object dump 900. For example, the computer generates object dump 900 using a disassembler or other tool to generate the listing of instructions with corresponding instruction address offset values. Branch instruction 805 has an offset value of 0x27 from the beginning of function 800. The address of branch instruction 805, when loaded into memory, is the sum of the address of function 800 and the offset value for branch instruction 805: 0x400504+0x27=0x40052B. Branch instruction 810 has an offset value of 0x44 from the beginning of function 800. The address of branch instruction 810 is 0x400504+0x44=0x400548. Branch instruction 815 has an offset value of 0x6c from the beginning of function 800. The address of branch instruction 815 is 0x400504+ 0x6c=0x400570.

Using a loader metadata file to determine the address for function 800, the computer may generate the entries shown in the following table and which map branch instruction addresses to corresponding branch instructions as described above.

TABLE 3

Branch Instruction Addresses

| | | |
|---|---|---|
| 0x40052B | 27: 75 0c | jne 35 <main + 0x35> |
| 0x400548 | 44: 75 32 | jne 78 <main + 0x78> |
| 0x400570 | 6c: 7e e1 | jle 4f <main + 0x4f> |

In an alternate embodiment, another identifier is assigned to each branch instruction. For example, each of a sequence of unique numbers is mapped to each branch instruction of function 800.

Returning to FIG. 6, at block 615, the computer initializes a run-time branch trace value to zero during the execution of a given function of the computer program. For example, a run-time branch trace value may be maintained for each function of the computer program. Each time a function is called, the run-time branch trace value is initialized to zero. In an alternate embodiment, a single run-time branch trace value is maintained for multiple functions of the computer program. The more functions included within a single branch trace, however, the greater the likelihood that there will be different branch traces that result in the same branch trace value.

At block 620, the computer updates the run-time branch trace value each time a branch is taken. The run-time branch trace value is updated to the result of a mathematical or logical operation between the current run-time stack trace value and the identifier of the branch instruction being executed. For example, the computer program obtains the address for branch instruction from the program counter or instruction pointer. The computer performs an XOR, addition, or other mathematical/logical operation on the obtained address and the run-time branch trace value and the result is the new value for the run-time branch trace value.

In one embodiment, branch instructions are modified to perform the XOR operation (or other mathematical/logical operation) and the computer stores the run-time branch trace value in a register. The computer may quickly execute branch instructions by accessing operands for these operations from the hardware registers. Alternatively, the computer saves the run-time branch trace value in memory, e.g., in a local variable per function or, if the branch trace spans multiple functions, the run-time branch trace value may be saved in thread-local storage.

Referring again to FIG. 8, branch instruction 805 performs a jump to ".L2" when a variable is not equal to 1. In one embodiment, branch instruction 805 is modified to include an instruction to copy the address of the instruction pointer or program counter into a register prior to the "jne.L2" instruction. Branch instruction 805 is further modified to include an instruction to perform the mathematical/logical operation between the register storing the copied address and the run-time branch trace value (e.g., stored in another register) following the "jne.L2" instruction and prior to printing the string, "Hello world" in the instruction following branch instruction 805. As a result, the mathematical/logical operation is performed if the branch is taken, e.g., in response to determining "a==1" to be true, as illustrated by branch instruction 705 in FIG. 7. Similarly, the computer modifies branch instruction 810 to copy the branch instruction address prior to the "jne.L4" instruction and performs the mathematical/logical operation between the register storing the copied address and the run-time branch trace value following the "jne.L4" instruction. As a result, the mathematical/logical operation is performed if the branch is taken, e.g., in response to determining "ptr==NULL" to be true, as illustrated by branch instruction 710 in FIG. 7. The computer also modifies branch instruction 815 to copy the branch instruction address prior to the "jle.L6" instruction and performs the mathematical/logical operation between the register storing the copied address and the run-time branch trace value prior to the first instruction in .L6. As a result, the mathematical/logical operation is performed if the branch is taken, e.g., in response to determining "i<3" to be true, as illustrated by branch instruction 715 in FIG. 7.

Following an exemplary path of execution for function 800, the run-time branch trace value is initialized to 0 upon entering function 800. Prior to branch instruction 805, the computer stores branch instruction address 0x40052B in an address register. The computer follows the branch ("a==1" is true) and performs the mathematical/logical operation between the run-time branch trace value and the instruction address in the address register, e.g., run-time branch trace value is updated to the result of 0 XOR 0x40052B, which is 0x40052B. Function 800 prints the string, "Hello world." Function 800 continues to the comparison and corresponding branch instruction 810. Prior to branch instruction 810, the computer stores branch instruction address 0x400548 in the address register. The computer follows the branch ("ptr==NULL" is true) and performs the mathematical/logical operation between the run-time branch trace value and the instruction address in the address register, e.g., run-time branch trace value is updated to the result of 0x40052B XOR 0x400548, which is 0x63. Function 800 continues to ".L5" and branch instruction 815. Prior to branch instruction 815, the computer stores branch instruction address 0x400570 in the address register. The variable "i" is equal to zero and the computer follows the branch ("i<3" is true) and performs the mathematical/logical operation between the run-time branch trace value and the instruction address in the address register, e.g., run-time branch trace value is updated to the result of 0x63 XOR 0x400570, which is 0x400513. The function continues through ".L6" to increment the value of the variable "i" to 1 and returns to branch instruction 815. Once again, the computer stores branch instruction address 0x400570 in the address register. The computer follows the branch ("i<3" is still true) and performs the mathematical/logical operation between the run-time branch trace value and the instruction address in the address register, e.g., run-time branch trace value is updated to the result of 0x400513 XOR 0x400570, which is 0x63. This loop is entered again after incrementing "i" to 2. The computer follows the branch ("i<3" is still true) and updates the run-time branch trace value to the result of 0x63 XOR 0x400570, which is 0x400513. This loop is not entered again after incrementing "i" to 3. Function 800 continues through the last command and returns.

As illustrated in the loop above, using XOR as the logical operation results in the run-time branch trace value alternating between one value for zero or an even number of iterations of the loop and another value for an odd number of iterations of the loop. As a result, a corresponding branch trace including such a loop will represent either an odd number of iterations of the loop or zero/an even number of iterations of the loop. In one embodiment, the computer annotates the run-time branch trace with an indication of an odd or even number of iterations of a loop at a given point in time. Alternatively, if the computer uses addition or another mathematical operation rather than XOR, each iteration of the loop will be represented in the run-time branch trace value. The use of a mathematical operation such as addition, however, includes the possibility of overflow. As a result, in one embodiment, the run-time branch trace value is stored in a register with the size of a "long long integer" data type or double the precision of the size of a pointer data type.

Returning to FIG. 6, at block 625, the computer determines if a function is called or returned. This determination is performed in parallel with the updating of the run-time branch trace value in block 620. If the currently executing function calls another function, at block 630, the computer stores the current run-time branch trace value. In one embodiment, the current run-time branch trace value is pushed onto the stack during the call for retrieval upon returning to the current function. Method 600 then returns to block 615 and initializes the run-time branch trace value for the new function. The run-time branch trace value for the new function is updated as described above. Upon returning to the original function, at block 635, the computer retrieves the stored run-time branch trace value (e.g., by popping it off of the stack or mapping a returned function to a saved value) and resumes updating the run-time branch trace value as needed for branch instructions at block 620.

In the absence of a function call or return, at block 640, the computer writes the run-time branch trace value to a log message, to a trace buffer, as a part of a core dump, etc. In one embodiment, the run-time branch trace value is an invisible local variable added to each function and is available in each function's call frame on the call stack. When debugging a core dump, a debugger or another tool retrieves the run-time branch trace value for a particular function frame. For example, the debugger is programmed to read the value from a fixed offset from either the top or bottom of the function call frame. In such an embodiment, the call frame for that function is popped off the stack when the function returns. In one embodiment, to avoid losing run-time branch trace value, the run-time branch trace value is copied to and stored (e.g., in a buffer) before a function frame is popped off the stack (e.g., as part of writing out a trace of invocations of various functions).

At block 645, a computer generates branch trace value(s) for at least one possible branch trace in the compiler metadata file using the identifiers from the loader metadata file. For example, if a first computer compiles the computer program and a second computer loads and executes the program, the first computer generated the compiler metadata file and receives the loader metadata file from the second computer. Alternatively, a second computer generated the loader metadata file and receives the compiler metadata file from the first computer. In another embodiment, a third computer receives the compiler metadata file from the first computer and the loader metadata file from the second computer. In yet another embodiment, a single computer generates/receives both metadata files.

Similar to the updating of the run-time branch trace value described with reference to block 620, the computer generates branch trace values for possible branch traces by performing a series of one or more mathematical or logical operations between the identifiers of the branch instructions in the branch trace. If a possible branch trace includes a single branch instruction, the branch trace value is set to the identifier for that branch instruction.

At block 650, the computer matches a run-time branch trace value to a generated branch trace value from the possible branch traces. For example, the computer may receive/read a run-time branch trace value of 0x40052B written or retained in block 640. Using the run-time branch trace value, the computer determines that the run-time branch trace value matches the branch trace value for a branch trace of function 800 that stopped at a point in time following branch instruction 805. Likewise, a run-time branch trace value of 0x63 would match a branch trace for function 800 stopping after executing branch instruction 810 or a branch trace for function 800 after two loops corresponding to branch instruction 815.

If multiple branch traces produce the same run-time branch trace value, the computer outputs all possible branch traces. In such cases, inspection of the local variable values (e.g., when looking at the stack of a thread) assists in determining if some of the branches could not have been taken as a result of a local variable value contradicting a known condition used for a branch instruction.

At block 655, the computer outputs the matching branch trace. For example, the computer may output an ordered list of each branch instruction executed up to a point in time at which the run-time branch trace value was written. Alternatively, the computer outputs a count of a number of times each branch instruction was executed.

Figure 10:
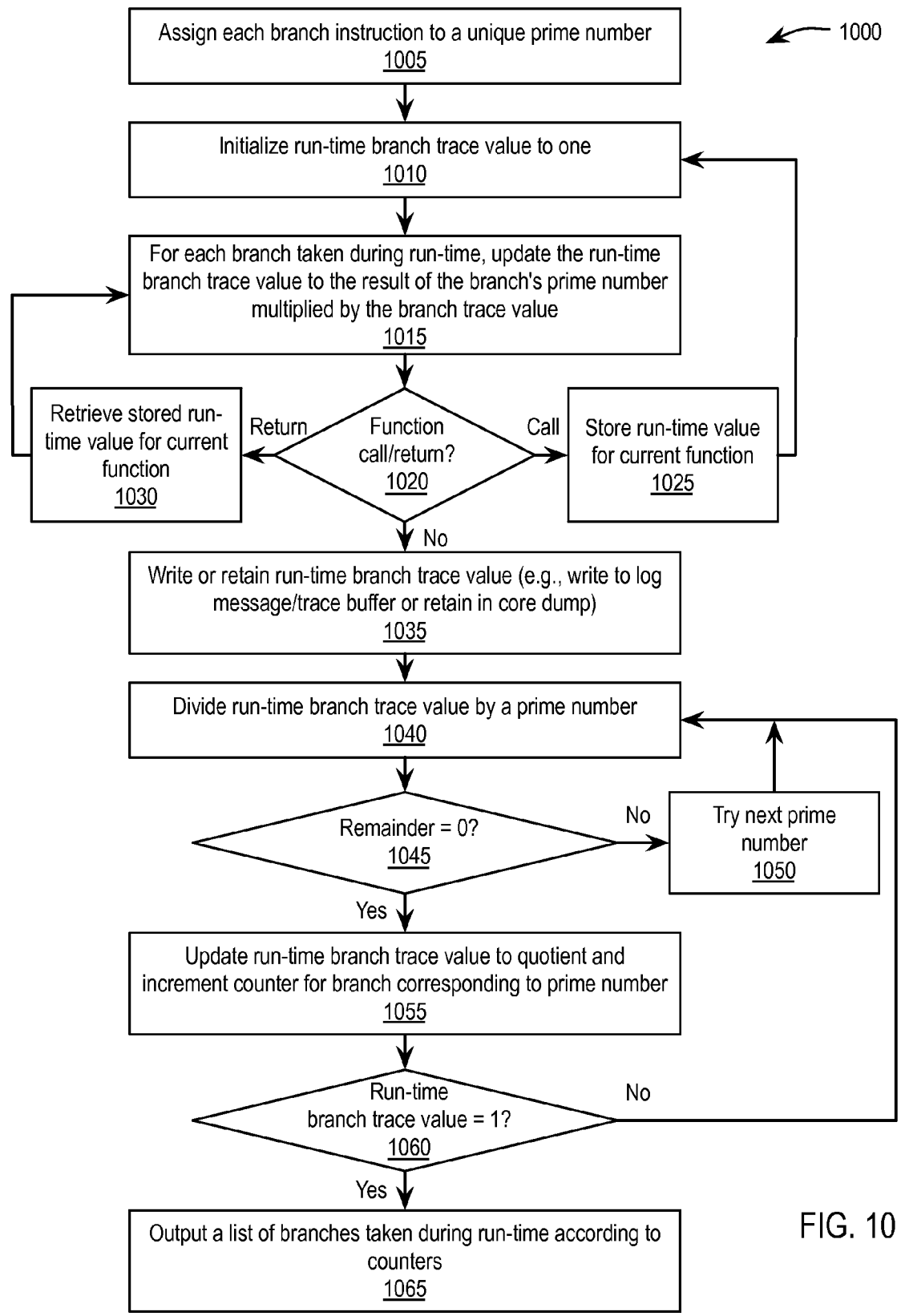
FIG. 10 is a flow chart illustrating an alternate method of generating a compressed branch trace value during run-time of a computer program and determining a branch trace based upon the compressed branch trace value.

FIG. 10 illustrates a flow chart illustrating alternate method 1000 of generating a compressed branch trace value during run-time of a computer program and determining a branch trace based upon the compressed branch trace value. At block 1005, a computer assigns each branch instruction of a function to a unique prime number. For example, the computer identifies each branch instruction from the object code of a function and assigns prime numbers in ascending order beginning with "2" to the identified branch instructions. A first branch instruction is assigned to 2, a second branch instruction is assigned to 3, a third branch instruction is assigned to 5, etc. In another embodiment, different prime numbers or a different order of prime numbers are assigned to the branch instructions.

At block 1010, the computer initializes the run-time branch trace value to one. For example, a run-time branch trace value may be maintained for each function of the computer program. Each time a function is called, the run-time branch trace value is initialized to one. In an alternate embodiment, a single run-time branch trace value is maintained for multiple functions of the computer program. In one embodiment, the run-time branch trace value is stored as an unsigned long data type.

At block 1015, the computer updates the run-time branch trace value each time a branch is taken. The run-time branch trace value is updated to the result of the prime number assigned to the current branch instruction multiplied by the branch trace value. Using the exemplary prime numbers above, if a first branch instruction is taken, the run-time branch trace value is updated to the product of the first branch instruction's prime number, 2, and the initial value of the run-time branch trace value, 1. As a result, the updated run-time branch trace value is 2. If the second branch instruction is taken, the run-time branch trace value is updated again: 3×2=6. If the third branch instruction is taken, the run-time branch trace value is updated again: 6×5=30. If a particular branch instruction were a loop, the run-time branch trace value may be multiplied by the loop's prime number multiple times (e.g., for each iteration of the loop).

At block 1020, the computer determines if a function is called or returned. This determination is performed in parallel with the updating of the run-time branch trace value in block 1015. If the currently executing function calls another function, at block 1025, the computer stores the current run-time branch trace value. In one embodiment, the current run-time branch trace value is pushed onto the stack during the call for retrieval upon returning to the current function. Method 1000 then returns to block 1010 and initializes the run-time branch trace value for the new function. The run-time branch trace value for the new function is updated as described above. Upon returning to the original function, at block 1030, the computer retrieves the stored run-time branch trace value (e.g., by popping it off of the stack or mapping a returned function to a saved value) and resumes updating the run-time branch trace value as needed for branch instructions at block 1015.

In the absence of a function call or return, at block 1035, the computer writes the run-time branch trace value to a log message, to a trace buffer, as a part of a core dump, etc. In one embodiment, the run-time branch trace value is an invisible local variable added to each function and is available in each function's call frame on the call stack. When debugging a core dump, a debugger or another tool retrieves the run-time branch trace value for a particular function frame. For example, the debugger is programmed to read the value from a fixed offset from either the top or bottom of the function call frame. In such an embodiment, the call frame for that function is popped off the stack when the function returns. In one embodiment, to avoid losing run-time branch trace value, the run-time branch trace value is copied to and stored (e.g., in a buffer) before a function frame is popped off the stack (e.g., for the purpose of tracing calls to different function invocations).

At block 1040, a computer divides a run-time branch trace value by a prime number to determine if the branch instruction assigned to that prime number was taken during execution of the function. For example, in response to reading or receiving the run-time branch trace value written in block 1035, the computer begins attempts to divide prime numbers into the run-time value to determine branch instructions taken during run-time.

At block 1045, the computer determines if the prime number divides into the run-time branch trace value without a remainder. If not, at block 1050, the computer determines that the current prime number was not a factor in reaching the run-time branch trace value and updates the current prime number to the next prime number for another attempt at division at block 1040.

If the current prime number divides into the run-time branch trace value without a remainder, at block 1055, the computer updates the run-time branch trace value to the quotient and increments a counter for the branch instruction corresponding to the current prime number. For example, if the run-time branch trace value is 30 and the first prime number is 2, the computer determines that 30 is divisible by 2 without a remainder and updates the run-time branch trace value to 30/2=15. Additionally, the first prime number, 2, is assigned to a first branch instruction, so the computer increments a counter or sets a flag corresponding to the first branch instruction to indicate that the first branch instruction was followed once during execution of the function. In one embodiment, counters are incremented up to, but not beyond, a predetermined maximum value.

At block 1060, the computer determines if the updated run-time branch trace value is equal to 1. If not, method 1000 returns to block 1040 to determine if the run-time branch trace value is divisible by the current prime number again or another prime number. The computer continues to determine which prime numbers evenly divide into the run-time branch trace value and increment the corresponding counters until the run-time branch trace value is updated to a value of 1.

When the updated run-time branch trace value returns to the initial value of 1, at block 1065, the computer outputs a list of branches taken within the function during run-time according to the counters/flags for each branch instruction. For example, the counters may indicate a number of times each of a plurality of branch instructions were executed. Using a listing of executed branch instructions, a user may at least partially reconstruct an order in which instructions were executed in the branch trace.

Figure 11:
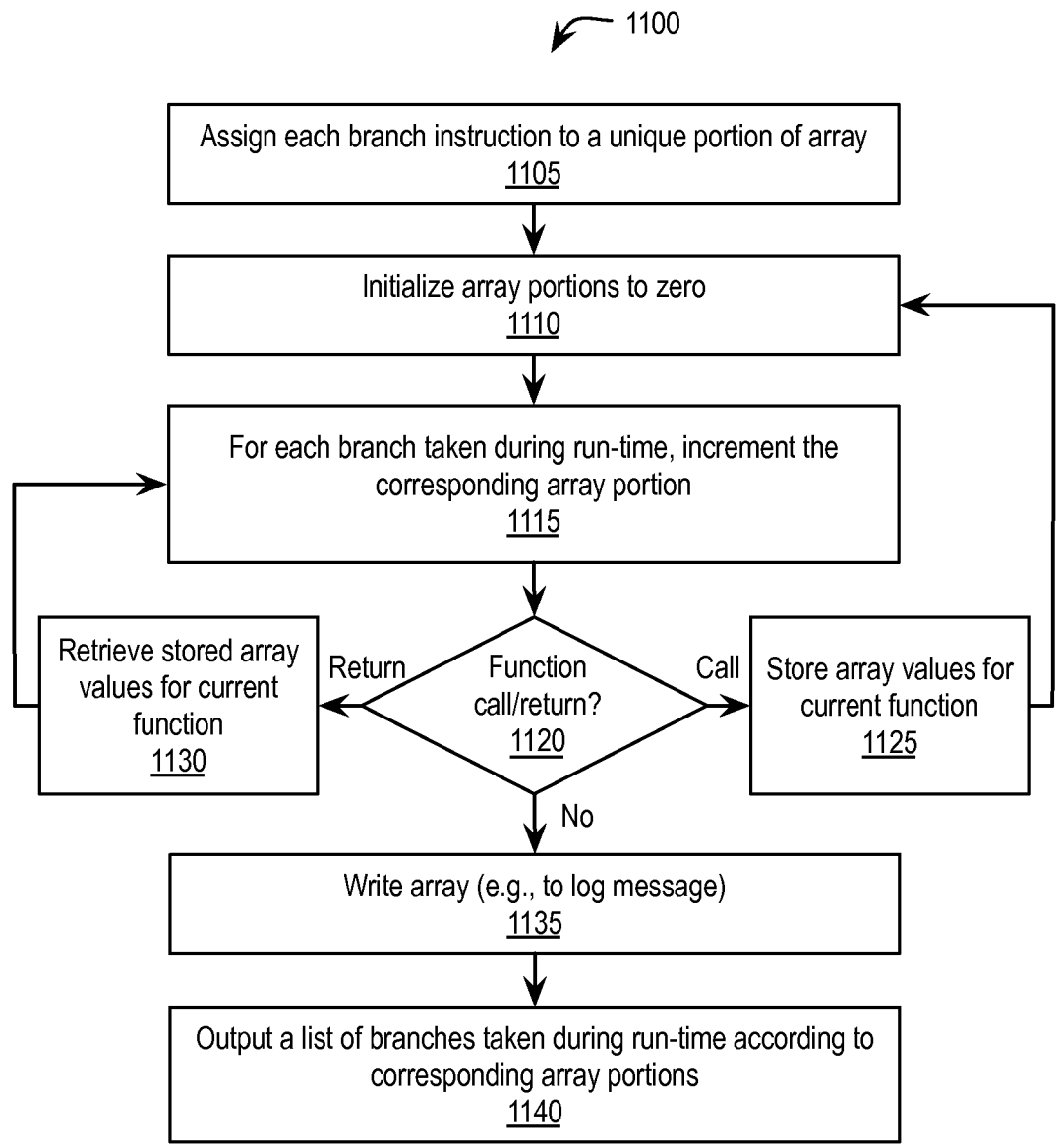
FIG. 11 is a flow chart illustrating another alternate method of generating a compressed branch trace value during run-time of a computer program and determining a branch trace based upon the compressed branch trace value.

FIG. 11 is a flow chart illustrating another alternate method 1100 of generating a compressed branch trace value during run-time of a computer program and determining a branch trace based upon the compressed branch trace value. At block 1105, a computer assigns each branch instruction of a function to a unique portion of a branch trace array. For example, the computer identifies each branch instruction from the object code of a function and assigns sequential portions of the array to the identified branch instructions.

At block 1110, the computer initializes each of the array portions to a value of zero. For example, array values may be maintained for each function of the computer program. Each time a function is called, the array portions are initialized to zero. In an alternate embodiment, a single run-time branch trace value is maintained for multiple functions of the computer program.

At block 1115, for each branch taken during run-time, the computer increments a corresponding array portion. For example, if a first branch instruction is assigned to a first portion of the array, upon taking the first branch, the computer increments the first portion of the array from zero to one.

At block 1120, the computer determines if a function is called or returned. This determination is performed in parallel with the incrementing of array portions in block 1115. If the currently executing function calls another function, at block 1125, the computer stores the current array values. In one embodiment, the current array values are pushed onto the stack during the call for retrieval upon returning to the current function. Method 1100 then returns to block 1110 and initializes each array portion to zero for the new function. The array values are incremented in the new function as described above. Upon returning to the original function, at block 1130, the computer retrieves the stored array values (e.g., by popping them off of the stack or mapping a returned function to a saved value) and resumes incrementing the array portions as needed for branch instructions at block 1115.

In the absence of a function call or return, at block 1135, the computer writes the array to a log message, to a trace buffer, as a part of a core dump, etc. In one embodiment, the array is added to each function and is available in each function's call frame on the call stack. When debugging a core dump, a debugger or another tool retrieves the array for a particular function frame. For example, the debugger is programmed to read the array from a fixed offset from either the top or bottom of the function call frame. In such an embodiment, the call frame for that function is popped off the stack when the function returns. In one embodiment, to avoid losing run-time branch trace value, the array is copied to and stored (e.g., in a buffer) before a function frame is popped off the stack (e.g., for the purpose of tracing calls to different function invocations).

At block 1140, in response to receiving a written array, a computer outputs a list of branches taken within the function during run-time according to array portions assigned to each branch instruction. For example, the array portions may indicate a number of times each of a plurality of branch instructions were executed. Using a listing of executed branch instructions, a user may at least partially reconstruct an order in which instructions were executed in the branch trace.

Figure 12:
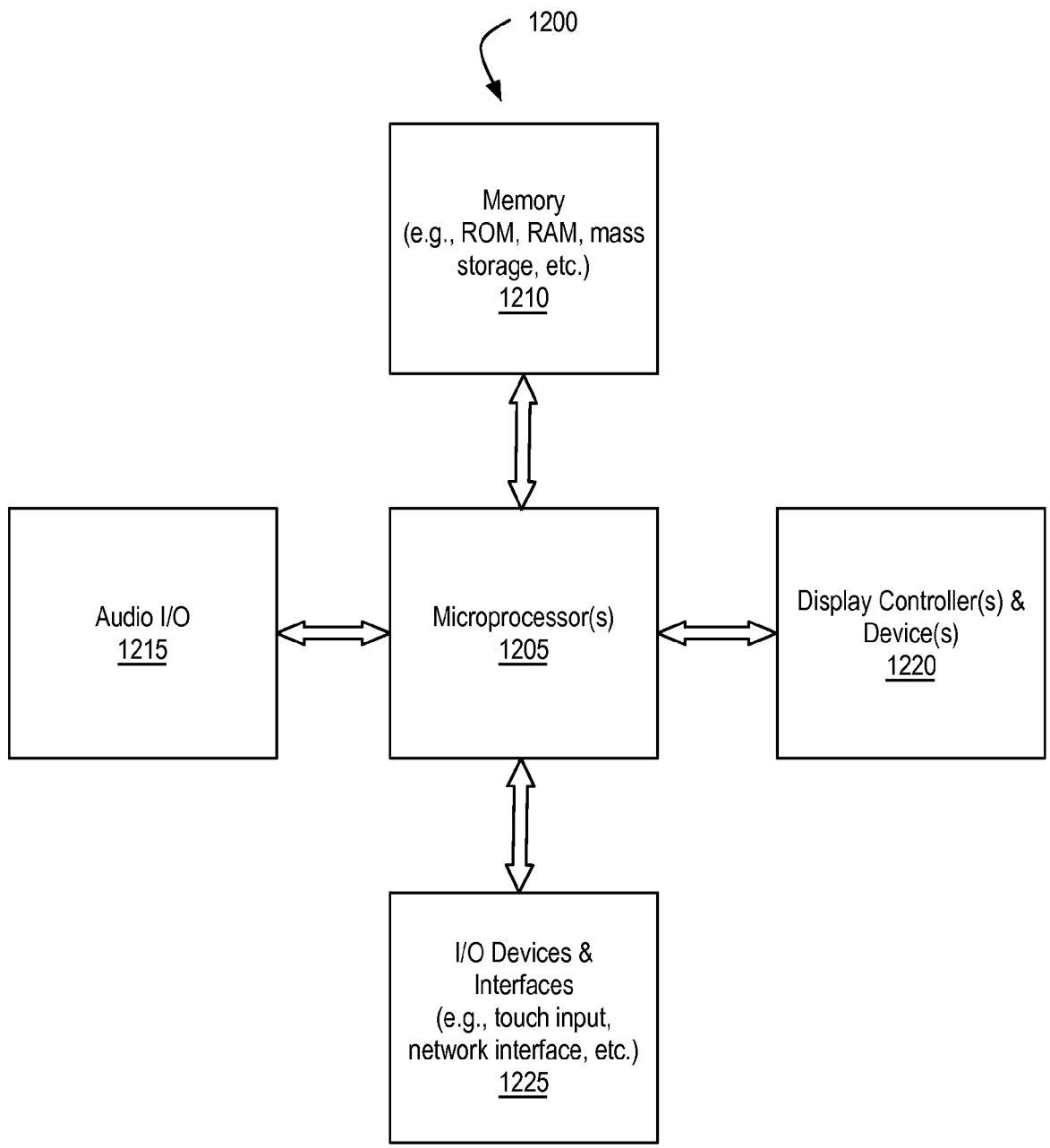
FIG. 12 illustrates, in block diagram form, an exemplary processing system to perform one or more features of the method of saving a compressed stack trace value and determining a stack trace based upon the compressed stack trace value.

FIG. 12 illustrates, in block diagram form, an exemplary processing system 1200 to perform one or more features of method of saving a compressed stack trace value and determining a stack trace based upon the compressed stack trace value. Data processing system 1200 includes one or more microprocessors 1205 and connected system components (e.g., multiple connected chips). Alternatively, data processing system 1200 is a system on a chip.

Data processing system 1200 includes memory 1210, which is coupled to microprocessor(s) 1205. Memory 1210 may be used for storing data, metadata, and programs for execution by the microprocessor(s) 1205. Memory 1210 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1210 may be internal or distributed memory.

Data processing system 1200 also includes audio input/output subsystem 1215 which may include a microphone and/or a speaker for, for example, playing back music or other audio, receiving voice instructions to be executed by microprocessor(s) 1205, playing audio notifications, etc. Display controller and display device 1220 provides a visual user interface for the user.

Data processing system 1200 also includes one or more input or output ("I/O") devices and interfaces 1225, which are provided to allow a user to provide input to, receive output from, and otherwise transfer data to and from the system. I/O devices 1225 may include a mouse, keypad or a keyboard, a touch panel or a multi-touch input panel, camera, optical scanner, network interface, modem, other known I/O devices or a combination of such I/O devices.

I/O devices and interfaces 1225 may also include a port, connector for a dock, or a connector for a USB interface, FireWire, Thunderbolt, Ethernet, Fibre Channel, etc. to connect the system 1200 with another device, external component, or a network. Exemplary I/O devices and interfaces 1225 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 1200 with another device, external component, or a network and receive stored instructions, data, tokens, etc. For example, in an embodiment in which multiple processing systems 1200 perform portions of the methods described herein, data is transferred between processing systems 1200 via an I/O device 1225. In one embodiment, one or more of a compiler metadata file, loader metadata file, run-time stack trace value, and log message/lock data structure is transmitted and/or received via I/O device 1225.

It will be appreciated that one or more buses, may be used to interconnect the various components shown in FIG. 12.

Data processing system 1200 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 1200 may be a network computer, server, or an embedded processing device within another device or consumer electronic product. As used herein, the terms computer, device, system, processing system, processing device, and "apparatus comprising a processing device" may be used interchangeably with data processing system 1200 and include the above-listed exemplary embodiments.

It will be appreciated that additional components, not shown, may also be part of data processing system 1200, and, in certain embodiments, fewer components than that shown in FIG. 12 may also be used in data processing system 1200. It will be apparent from this description that aspects of the inventions may be embodied, at least in part, in software. That is, the computer-implemented method(s) 100, 300, 500, 600, 1000, and 1100 may be carried out in one or more computer systems or other data processing systems 1200 in response to its respective processor or processing system 1205 executing sequences of instructions contained in a memory, such as memory 1210 or other non-transitory machine-readable storage medium. The software may further be transmitted or received over a network (not shown) via network interface device 1225. In various embodiments, hardwired circuitry may be used in combination with the software instructions to implement the present embodiments. Thus, the techniques are not limited to any specific combination of hardware circuitry and software, or to any particular source for the instructions executed by data processing system 1200.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method, comprising:
    assigning a plurality of branch instructions within a computer program to a plurality of prime numbers, wherein each branch instruction is assigned a unique prime number within the plurality of prime numbers;
    receiving or reading a run-time branch trace value generated while the computer program is executed;
    determining the run-time branch trace value is divisible, without a remainder, by a first prime number of the plurality of prime numbers; and
    generating an output, in response to the determination, indicating that a first branch instruction assigned to the first prime number was executed during an execution of the computer program that generated the run-time branch trace value.

2. The computer-implemented method of claim 1, further comprising:
    updating the run-time branch trace value to the result of the run-time branch trace value divided by the first prime number.

3. The computer-implemented method of claim 2, further comprising:
    determining that the updated run-time trace value is equal to one; and
    determining that the updated run-time branch trace value is not divisible by any other prime numbers.

4. The computer-implemented method of claim 2, further comprising:
    determining that the updated run-time trace value is not equal to one; and
    determining the updated run-time branch trace value is divisible, without a remainder, by the first prime number, wherein the generated output indicates that the first branch instruction was executed multiple times.

5. The computer-implemented method of claim 2, further comprising:
    determining that the updated run-time trace value is not equal to one;
    determining that dividing the updated run-time branch trace value by the first prime number would result in a non-zero remainder;
    determining that the updated run-time branch trace value is divisible, without a remainder, by a second prime number of the plurality of prime numbers; and
    generating an output, in response to the determination, indicating that a second branch instruction assigned to the second prime number was executed during an execution of the computer program that generated the run-time branch trace value.

6. The computer-implemented method of claim 5, further comprising:
    updating the updated run-time branch trace value to the result of the updated run-time branch trace value divided by the second prime number.

7. The computer-implemented method of claim 1, wherein the generation of the run-time branch trace value comprises: initializing the run-time value to one; and each time a branch instruction is executed during execution of the computer program, multiplying the prime number assigned to the executed branch instruction with the run-time branch trace value to update the run-time branch trace value.

8. The computer-implemented method of claim 7, wherein the generation of the run-time branch trace value further comprises:
    saving the run-time branch trace value in response to a call of a function;
    initializing the run-time branch trace value to one for the called function; and
    restoring the saved run-time branch trace value in response to a return from the function.

9. A non-transitory computer-readable medium storing instructions, which when executed by a processing device, cause the processing device to perform method comprising:
    assigning a plurality of branch instructions within a computer program to a plurality of prime numbers, wherein each branch instruction is assigned a unique prime number within the plurality of prime numbers;
    receiving or reading a run-time branch trace value generated while the computer program is executed;
    determining the run-time branch trace value is divisible, without a remainder, by a first prime number of the plurality of prime numbers; and
    generating an output, in response to the determination, indicating that a first branch instruction assigned to the first prime number was executed during an execution of the computer program that generated the run-time branch trace value.

10. The non-transitory computer-readable medium of claim 9, further comprising:
    updating the run-time branch trace value to the result of the run-time branch trace value divided by the first prime number.

11. The non-transitory computer-readable medium of claim 10, further comprising:
    determining that the updated run-time trace value is equal to one; and
    determining that the updated run-time branch trace value is not divisible by any other prime numbers.

12. The non-transitory computer-readable medium of claim 10, further comprising:
    determining that the updated run-time trace value is not equal to one; and
    determining the updated run-time branch trace value is divisible, without a remainder, by the first prime number, wherein the generated output indicates that the first branch instruction was executed multiple times.

13. The non-transitory computer-readable medium of claim 10, further comprising:
    determining that the updated run-time trace value is not equal to one;
    determining that dividing the updated run-time branch trace value by the first prime number would result in a non-zero remainder;
    determining that the updated run-time branch trace value is divisible, without a remainder, by a second prime number of the plurality of prime numbers; and
    generating an output, in response to the determination, indicating that a second branch instruction assigned to the second prime number was executed during an execution of the computer program that generated the run-time branch trace value.

14. The non-transitory computer-readable medium of claim 13, further comprising:
    updating the updated run-time branch trace value to the result of the updated run-time branch trace value divided by the second prime number.

15. The non-transitory computer-readable medium of claim 9, the generation of the run-time branch trace value comprising:
    initializing the run-time value to one; and
    each time a branch instruction is executed during execution of the computer program, multiplying the prime number assigned to the executed branch instruction with the run-time branch trace value to update the run-time branch trace value.

16. The non-transitory computer-readable medium of claim 15, wherein the generation of the run-time branch trace value further comprises:
    saving the run-time branch trace value in response to a call of a function;
    initializing the run-time branch trace value to one for the called function; and
    restoring the saved run-time branch trace value in response to a return from the function.

\* \* \* \* \*

UNITED STATES PATENT AND TRADEMARK OFFICE
CERTIFICATE OF CORRECTION

PATENT NO. : 9,442,725 B2  
APPLICATION NO. : 13/972745  
DATED : September 13, 2016  
INVENTOR(S) : Rajiv Madampath Page 1 of 1

It is certified that error appears in the above-identified patent and that said Letters Patent is hereby corrected as shown below:

On the Title Page

Item (73), should read:  
Assignee: VMware, Inc., Palo Alto, CA (US)

Signed and Sealed this  
Eleventh Day of December, 2018

Andrei Iancu  
*Director of the United States Patent and Trademark Office*